Feb. 17, 1959     E. J. SCHWOEGLER ET AL     2,874,097
RECOVERY OF INDENE BY AZEOTROPIC PURIFICATION WITH FURFURAL
Filed July 27, 1956
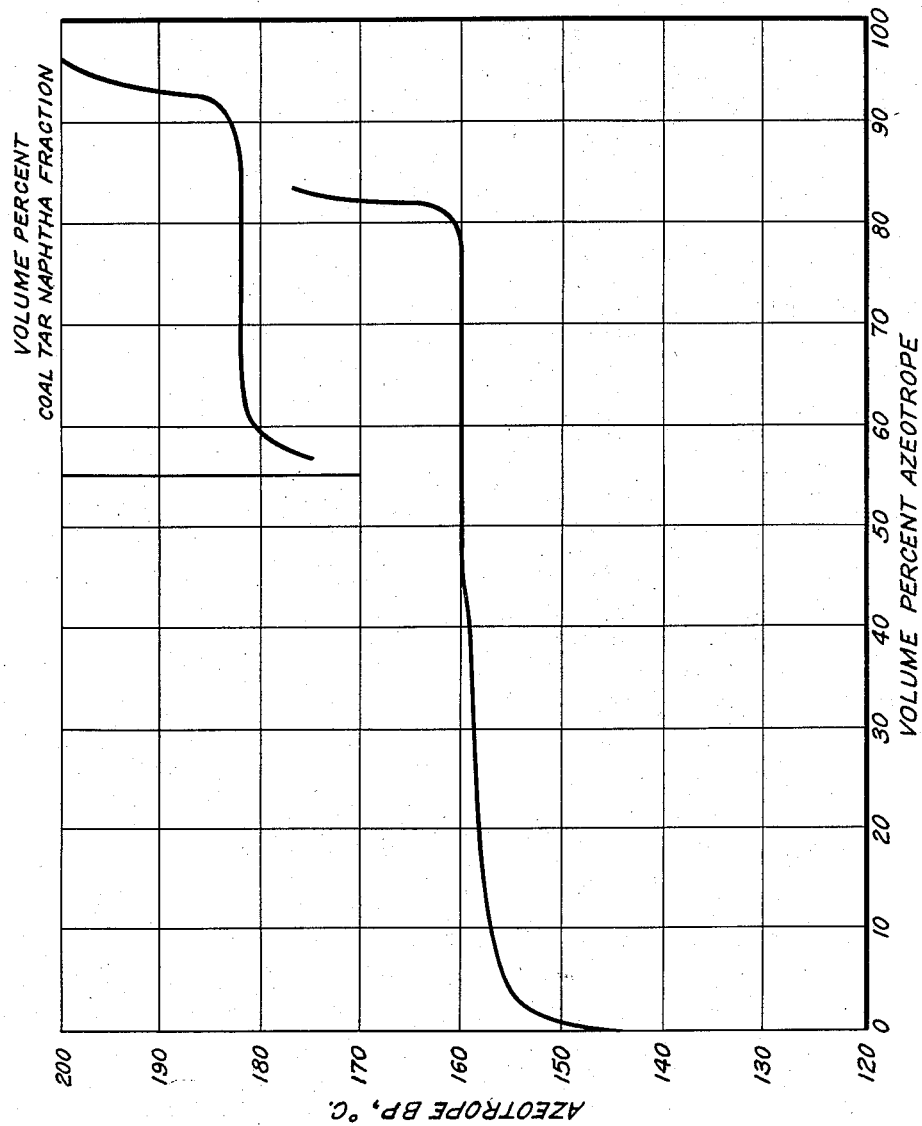
INVENTORS
EDWARD T. SCHWOEGLER
and RICHARD E. PUTSCHER
BY Burns, Doane, Benedict & Scons
ATTORNEYS

United States Patent Office 2,874,097
Patented Feb. 17, 1959

2,874,097

RECOVERY OF INDENE BY AZEOTROPIC PURIFICATION WITH FURFURAL

Edward J. Schwoegler, Munster, and Richard E. Putscher, Hammond, Ind., assignors, by mesne assignments, to Neville Chemical Company, Pittsburgh, Pa., a corporation of Pennsylvania Application July 27, 1956, Serial No. 600,463

4 Claims. (Cl. 202—42)

This invention relates to a process for separating indene from hydrocarbon mixtures containing it by azeotropic distillation wherein the non-indene constituents are removed as an azeotrope with furfural.

Indene containing oils such as those obtained by fractional distillation of coal tar oils, water gas oils, drip oils, etc. contain hydrocarbons boiling closely to indene and consequently the recovery of all of the indenes from these oils is difficult. The oils are usually fractionally distilled to produce a naphtha fraction which may contain from 30–75% of indene but more typically contain 30–60%. These napthas generally boil in the range of about 160 to 190 or 200° C. or slightly higher. The non-indene constituents comprise saturated hydrocarbons which are largely naphthenic in nature; substituted benzenes such as styrene, ethyl benzenes, trimethyl benzenes, etc.; and some non-hydrocarbon constituents such as methyl pyridines, benzonitrile, coumarone, methyl coumarone, etc.

When indene fractions containing as much as 75% of indene are produced by fractional distillation, the indene recovery amounts to only about 20% of the indene available from the starting material. Consequently the production of such fractions by straight fractional distillation entails a high loss of available indene.

Indene is largely used at present for producing resins. Pure indene is not commercially available and a process which will produce high purity indene is desirable since the uses of indene could be extended. As an example, it would permit the production of valuable indene derivatives not now commercially feasible or possible.

It has heretofore been proposed to separate indene by azeotropic distillation of indene-containing naphthas using a material which will form an azeotrope with both indene and the non-indene constituents. The azeotropes of the non-indene constituents boil below the azeotrope of indene. The indene may be recovered from the bottom fraction either by continuing the azeotropic distillation or by straight non-fractional distillation of the residue. In this way an indene product said to contain from 89% to as much as 98% indene may be produced. However, the data reported show recoveries of only about 41% to about 65% of the indene contained in the charge as a product containing 90% to 94% indene. Such a process is described in United States Patent 2,279,780 issued to Carl H. Engel.

We have discovered that when using an azeotrope former which forms an azeotrope only with the non-indene constituents and not with indene, products of comparable purity can be obtained, while the recovery amounts to 75–90% of the indene present in the naphtha charge. The azeotrope former employed is furfural. Distillation of a mixture of pure indene and furfural shows separation of the two without formation of a furfural-indene azeotrope.

In one specific embodiment our process comprises subjecting an indene containing naphtha to azeotropic distillation in the presence of furfural, thereby removing the major portion of the non-indene component of the naphtha and thereafter subjecting the residue to non-azeotropic fractional distillation in a high efficiency column to recover from about 75% to about 95% of the indene in the original naphtha at a purity of about 90% to 95% or higher.

The starting materials are generally prepared as previously described by fractional distillation of indene-containing oils to produce a fraction containing a major portion of the indene in said oils. While the boiling range of the naphtha produced is not critical it is generally in the range of about 160° to about 200° C. While the naphtha may contain 30% to 70% or 75% indene, for the purposes of this invention it is preferred to start with a naphtha containing about 30% to about 60% indene since such naphthas will represent a higher recovery of available indene from the starting oil than those of higher indene content. If the indene content is too low it represents an added load on the azeotropic distillation step since it requires removal of a larger amount of non-indene constituents.

The azeotropic distillation may be carried out on a continuous basis or may be carried out in a batch operation. In any event the furfural is added to the distillation step together with the naphtha. In batch operations all of it may be added initially, or it may be added intermittently or continuously while the distillation proceeds. Addition of excess furfural beyond that required to insure removal of the non-indene constituents serves no useful purpose. Any excess furfural present in the bottoms product may be removed by fractional distillation since its boiling point (161.5° C.) is well below that of indene (182.6° C.), or by known methods such as continuous solvent extraction with low boiling saturated hydrocarbons such as hexane.

The following example is given to illustrate the effectiveness of the process. The naphtha employed had the characteristics shown in Table I. It is evident from the refractive indices that the naphtha is highly aromatic.

TABLE I

*Distillation data on coal tar naphtha fraction*

[25-PLATE COLUMN; REFLUX RATIO 10 TO 1]

| Fraction | 750 mm. | | | 100 mm. | | |
|---|---|---|---|---|---|---|
| | Vapor Temp., ° C. | Wt. per-cent | $n_D^{25}$ | Vapor Temp., ° C. | Wt. per-cent | $n_D^{25}$ |
| 1 | 135–160 | 1.1 | 1.4944 | 97–101 | 4.3 | 1.5000 |
| 2 | 165 | 2.5 | 1.5025 | 104 | 6.2 | 1.5085 |
| 3 | 170 | 18.7 | 1.5158 | 107 | 13.8 | 1.5185 |
| 4 | 175 | 29.9 | 1.5327 | 109 | 13.9 | 1.5288 |
| 5 | 177 | 9.6 | 1.5475 | 111 | 10.6 | 1.5390 |
| 6 | 178 | 8.2 | 1.5526 | 112 | 4.8 | 1.5450 |
| 7 | 179 | 12.7 | 1.5562 | 113 | 11.1 | 1.5507 |
| 8 | 180 | 4.5 | 1.5561 | 114 | 15.6 | 1.5570 |
| 9 | 181 | 0.9 | 1.5508 | 115 | 12.0 | 1.5584 |
| 10 | 185 | 0.9 | 1.5422 | Residue | 6.1 | 1.5410 |
| 11 | 189 | 1.9 | 1.5300 | | | |
| Residue Heavy Oil | | 3.0 | | | | |
| Resin | | 4.3 | | | | |
| Total Recovery | | 98.2 | | | 98.4 | |

In making this run 120 parts of furfural and 80 parts of a coal tar naphtha fraction containing about 40% of indene were distilled in a still equipped with a 100-plate Podbielniak column at atmospheric pressure. When the temperature reached a point between about 175–180° C., the distillation was discontinued. The furfural was removed from the various fractions taken and the results are shown in Table II.

TABLE II

*Fractions from the azeotropic distillation of coal tar naphtha with furfural*

[120 ML. FURFURAL AND 80 ML. CTNF]

| Fraction | B. P., °C. | CTNF Vol., percent | Furfural-free Fractions | | |
|---|---|---|---|---|---|
| | | | $n_D^{25}$ | $d_4^{25}$ | RI [1] |
| 1 | 145–155 | 4 | 1.4570 | 0.8126 | 1.0507 |
| 2 | 155–175 | 48 | 1.5213 | 0.9188 | 1.0619 |
| 3 (Bottoms) | 175+ | 43 | 1.5708 | | |
| Loss | | 5 | | | |

[1] Refractivity intercept ($n_D$–0.5$d$).

Bottoms were then fractionally distilled in the 100-plate column at atmospheric pressure with the results shown in Table III.

TABLE III

*Fractionation of bottoms from azeotropic distillation with furfural*

| Fraction | B. P., °C. | CTNF Vol., percent | $n_D^{25}$ | $d_4^{25}$ | RI [1] | Indene, percent |
|---|---|---|---|---|---|---|
| 1 | 175–180 | 2.0 | 1.5636 | | | 75 |
| 2, 3 | 180–154 | 33.0 | 1.5698 | 0.9900 | 1.0748 | 90–95 |
| 4 | 184–200 | 3.7 | 1.5400 | | | ≃30 |
| 5 | 200–225 | 0.9 | 1.5675 | | | |
| 6 (Bottoms) | 225+ | 3.4 | | | | |

[1] Refractivity intercept.

It will be seen that the single treatment resulted in a recovery of about 75% of the indene in the original coal tar fraction, the product containing about 90% to 95% of indene. By reprocessing the small fractions of indene-containing material boiling immediately below and above the heart cut the recovery of indene in the original naphtha can be increased to as much as 85–90% by volume of a purity of 90–95%. This is in sharp contrast with the low recoveries reported when using materials which form azeotropes with both indene and non-indene constituents.

To illustrate the sharp separation which may be obtained, the Figure appended hereto is presented. The lower curve shows the volume percent of the azeotrope plotted against the boiling point of the azeotrope. It will be observed that a sharp break occurs when the non-indene fractions have been removed.

The upper curve shows the fractional distillation charactertistics of the bottoms from the azeotropic distillation which was carried out in a 100-plate column. The volume percent based on the original naphtha is plotted against vapor temperature of the overhead. It will be noted that a small fraction containing substantial quantities of indene was obtained at the beginning of the fractional distillation. This fraction may contain as much as 75% indene and can be recycled to the azeotropic step for further recovery of indene. It will also be observed that when substantially all of the indene had been distilled overhead there was another sharp break as the higher boiling non-indene constituents began to come overhead. These runs were made at atmospheric pressure. Subatmospheric or superatmospheric pressure may be employed.

The foregoing is given by way of illustration and should not be construed as limiting the invention to the exact details described.

We claim as our invention:

1. A process for recovering high purity indene from highly aromatic naphthas containing substantial amounts of indene which comprises subjecting said mixtures to distillation in the presence of an amount of furfural sufficient to form azeotropes with non-indene constituents, removing a major portion of the non-indene constituents as their furfural azeotropes and recovering indene of enhanced purity.

2. The process of claim 1 wherein the still residue is subjected to efficient non-azeotropic fractional distillation to recover a fraction of high purity indene as an overhead product.

3. A process for recovering high purity indene which comprises subjecting a highly aromatic naphtha boiling principally within the range of about 160° C. to about 200° C. and containing at least about 30% indene to distillation in the presence of furfural, removing a major portion of non-indene constituents as their furfural azeotrope and recovering indene of enhanced purity.

4. The process of recovering high purity indene from highly aromatic naphthas boiling principally within the range of about 160° C. to about 200° C. which comprises distilling said naphtha in the presence of furfural, removing the major portion of non-indene constituents in the form of their furfural azeotropes, subjecting the indene-containing bottoms from the azeotropic distillation to an efficient non-azeotropic fractional distillation and recovering indene as an overhead product in a purity of at least about 90% by volume.

References Cited in the file of this patent

UNITED STATES PATENTS

| 2,279,780 | Engel | Apr. 14, 1942 |
| 2,600,182 | Arnold et al. | June 10, 1952 |

FOREIGN PATENTS

| 513,566 | Great Britain | of 1939 |

OTHER REFERENCES

Horsley: "Azeotropic Data," June 1952, page 134.